United States Patent Office 2,842,577
Patented July 8, 1958

2,842,577

PROCESS FOR DECOLORIZING GREEN SOYBEAN OIL

Kurt G. Stern, New York, N. Y.; Hans S. Grossmann, executor of said Stern, deceased, assignor to Harry Sobotka, New York, N. Y.

No Drawing. Application August 5, 1954
Serial No. 448,122

14 Claims. (Cl. 260—428.5)

This invention relates to a method of processing soybean oil, and more particularly to a method of removing green pigment from such oil.

A main object of the invention is to provide a novel and improved method of removing green coloration from soybean oil.

A further object of the invention is to provide an improved method of decolorizing soybean oil, said method being easy to carry out, employing inexpensive materials, and being highly effective.

Further objects and advantages of the invention will become apparent from the following description and claims.

Soybean oil is a commodity widely used for the preparation of edible vegetable fat preparations such as shortening, margarine, mayonnaise, and the like, wherein it is used successfully in lieu of the more expensive cottonseed oil. For its various uses, the soybean oil has to undergo a refining process to remove its yellow to amber color and its specific taste and odor, and also to remove substances, which, while in themselves are tasteless, give rise during further processing and storage to the return of a disagreeable odor and taste by what is known as "reversion."

In spite of the techniques which have been worked out for these refining procedures, soybean oil retains, on refining, varying amounts of green pigment presumably related to, but not necessarily identical with, chlorophyll or some of its derivatives, with a maximum light absorption at a wavelength of 670 millimicrons. The amounts of green pigment vary from sample to sample and from year to year, depending primarily on the degree of maturity of the bean at the time of harvest. Because of weather conditions, the beans are often harvested while still green. Although some processors specify to the growers a maximum water content for the beans in order to exclude green beans, there are years when the greater part of the soybean crop yields oils which pose a problem to the refiner and consumer because of the excessive amount of green pigment therein. This in turn limits the usefulness of the oils, as the green pigment is even refractory to hydrogenation and gives a distinctive and undesired green tinge to the hardened fat. The problem is rendered even more difficult by the fact that the oil before decolorizing is so dark that the green tinge is not easily detected by the naked eye.

In prior art practice, the refiner or industrial consumer has employed acid clay, such as Filtrol, to remove the green pigment. While this will work in oils with small amounts of green pigment, larger quantities cannot be removed even with more than proportionally larger amounts of acid clay. Besides, the acidity of the clay tends to disintegrate the filter cloth used in the filter presses, thus adding to the cost of the process.

The complete and satisfactory removal of green pigment cannot be accomplished by any of a number of procedures which a chemist would ordinarily consider effective for this purpose. Treatment with acid, alkali, oxidizing, and reducing agents is without effect, and is undesirable because of the action of these reagents on other constituents of the oils. It has also been found that irradiation with very large doses of X-rays, ultraviolet rays, and with powerful electron beams are ineffective. The use of ethylene gas during storage, which is known to de-green citrus fruit, does not affect the green pigment in soybeans.

The removal of green pigment can be checked by spectrophotometric measurement. It can be seen from a comparison of transmission curves that the yellow pigment causes a strong absorption at wavelengths of less than 550 millimicrons, which tails off to higher wavelengths throughout the visible range. Hence, one cannot use as a criterion for removal of green pigment the absolute transmission value at 670 millimicrons, but the extent of the dip from the shoulder of maximum transmission, around 600 millimicrons, toward a minimum at 670 millimicrons, offers a satisfactory measure. Effective removal of green pigment implies that this dip is one percent or less when the transmission is measured in a layer of 10 mm. thickness in 50 percent hexane solution.

I have found that oligosaccharides (mono- and disaccharides), referred to below as "sugars," are able to completely remove the green pigment by adsorption, and that this reaction will only take place under circumstances specified below.

While natural chlorophyll can be adsorbed by powdered sugar, the green pigment in soybean oil has different properties.

It is to be further noted that:

(1) The green pigment cannot be removed with sucrose from crude oil. The soybean oil must be subjected to a pre-treatment with vegetable charcoal, using from 0.4 to 1.0 percent of the weight of the oil. This pre-treatment, if carried out with the undiluted oil, must be effected at elevated temperatures of about 90° C. As an alternative, the charcoal treatment may be performed cold with the oil dissolved in an equal amount of a suitable solvent, such as hexane. In practice, this may be achieved by interrupting the distillation of the original hexane extract when the solution is concentrated to about 50 percent oil content. Thorough shaking or stirring, for example, with an ultrasonic vibro-mixer, is necessary for this cold charcoal pre-treatment.

For example, the transmission at 670 millimicrons under the conditions mentioned above was 10 percent for an extremely green oil. After charcoal treatment, the transmission rose to 55 percent with either method of pre-treatment. This rise is due both to the removal of the prevailing yellow pigment and to partial removal of the green pigment. The most important effect of the charcoal treatment, however, is the removal of an inhibitor substance which prevents the adsorption of green pigment by sucrose.

(2) The green pigment cannot be removed after the oil has been subjected to acid treatment. The refining process with acid clay affects the physical properties of the green pigment by increasing its affinity for the lipoid phase and conversely by reducing its adsorbability on sucrose. This reaction is related to the isomerization of chlorophyll by acid observed by Willstaetter and Stoll. It may include a transesterification leading to ester formation between a carboxylic acid group of the pigment molecule with the glycerides of the oil. Therefore, the adsorption of sucrose must be carried out before, or at the latest, simultaneously with, the acid clay treatment.

The amounts of sugar required for removal of the green pigment must be determined from batch to batch. The highest amount for an extremely green oil was 5 percent of the weight of the oil, but in general, smaller amounts, say, from one to three percent will suffice. The sugar may be used, for instance, in the case of cane sugar (sucrose), as powdered sugar, white granulated sugar, or crystalline brown sugar, or in the case of glucose, as powdered glucose, or as corn syrup total solids. The adsorption process requires vigorous stirring.

The process will in general be carried out as a batch procedure by adding the sugar, with or without the Filtrol (acid treated clay) to a batch of oil, concentrated oil extract, or another concentrated oil solution. This is, however, only one form of effecting the adsorption reaction, and it is to be understood that the process of the present invention may also be carried out in other forms, for example, as a continuous process employing adsorption chromatography, as is described below in connection with Example 3. It will be further understood that it may be profitable in some cases to work with smaller quantities of adsorbent and to repeat the process for complete decoloration, whereby the cost of the process may be reduced in some instances.

Another favorable factor consists in the possibility of using the sugar residues for animal feed.

The following examples are intended to illustrate the process of the present invention, but should not be construed to limit the performance of the process to the specific form, the proportions of the ingredients, the durations of the individual phases of the treatment, and the other details of the cases given.

*Example 1.*—Ten kg. of an extremely green oil was pretreated with 100 g. of vegetable charcoal (Coleman Bell), heating it for 10 minutes to 85° C. The oil was then filtered off, diluted with 10 l. of hexane and treated simultaneously with 450 g. of sucrose, applied as a mixture of 40 parts confectioners powdered sugar and 60 parts of granulated sugar, plus 50 g. of Filtrol. The refined oil showed a transmission curve with complete disappearance of the dip at 670 millimicrons.

Without the use of sugar, the Filtrol treatment alone yielded an oil having a high transmission for the yellow wave length, showing the refining effect of Filtrol for the yellow color, but showed a considerable transmission dip at 670 millimicrons.

*Example 2.*—Essentially the same results were obtained in a run without the use of hexane as a diluent, but the mechanical loss of oil, retained in the filtration residue, was higher.

*Example 3.*—An oil containing an average amount of green pigment was dissolved in an equal quantity of Skellysolve–C (boiling point between 85° and 100° C.). The adsorption curve of the solution showed relatively low transmission below 550 millimicrons and a sharp dip at 670 millimicrons. The solution was stirred at room temperature with 1 percent (of the total volume) of charcoal and filtered. The dip in the adsorption curve at 670 millimicrons was then less pronounced. To the filtrate was then added 1½ percent (of the total volume) of crystalline brown sucrose and 0.2 percent (of the total volume) of Filtrol. The refined oil was isolated by continual centrifugation in a Sharpless centrifuge. It then showed a transmission curve with relatively high transmission of the wavelengths below 550 millimicrons and complete disappearance of the dip at 670 millimicrons. When no sucrose was used, a dip of about 4½ percent transmission remained between 650 and 670 millimicrons.

*Example 4.*—5 kg. of green oil was treated with 50 g. of vegetable charcoal as described in Example 1. The filtered oil was diluted with 5 litres of Skellysolve–C, and 200 g. of corn syrup solids, together with 25 g. of acid clay, were added. The resulting refined oil had a transmission curve showing no dip at 670 millimicrons. The residue after centrifugation showed a distinct green color.

*Example 5.*—An oil containing an average amount of green pigment was charcoal-treated at room temperature, as described in Example 3. It was then diluted with an equal volume of Skellysolve–C and treated with 2 percent (of the total volume) of powdered glucose and 0.2 percent (of the total volume) of acid clay. The refined oil obtained after centrifugation in a Sharpless centrifuge showed no dip at 670 millimicrons in its transmission curve.

*Example 6.*—This was a repetition of Example 5, but using powdered lactose instead of powdered glucose, and gave substantially the same results.

*Example 7.*—An oil containing an average amount of green pigment was treated with charcoal at 85° C., as described in Example 1. It was then diluted with an equal volume of Skellysolve–C (boiling point 85° to 100° C.) and refined by the addition of 2 percent crude levulose (fructose) (of the total volume) and 0.2 percent of acid clay (of the total volume). After centrifugation, the refined oil showed a transmission curve having no dip at 670 millimicrons.

*Example 8.*—150 ml. of an oil pretreated with charcoal at 90° C. was dissolved in 150 ml. of hexane and passed during the course of 2 hours through a chromatographic column. This consisted of a glass tube of 38 mm. inside diameter, filled over a height of 200 ml. with a mixture of equal amounts of powdered and granulated sucrose. The oil solution, after subsequent treatment with Filtrol, showed no dip in its absorption curve between 650 and 700 millimicrons. The sucrose from the column displayed a green color which could be dissolved in petrolic ether.

While certain specific embodiments of a method of processing soybean oil to remove the green coloration therefrom have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with a material selected from the group comprising monosaccharides and disaccharides.

2. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with sucrose.

3. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with lactose.

4. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with glucose.

5. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with fructose.

6. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with corn syrup solids.

7. A process for the removal of green coloration attributed to transformation products of chlorophyll with maximum light absorbancy at substantially 670 millimicrons from soybean oil comprising the steps of first treating the oil with charcoal at an elevated temperature sufficiently to remove inhibitor substances, and then treating the oil with a material selected from the group comprising monosaccharides and disaccharides.

8. A process for the removal of green coloration attributed to transformation products of chlorophyll with maximum light absorbancy at substantially 670 millimicrons from soybean oil comprising the steps of first treating the oil with charcoal at an elevated temperature, using from 0.4 to 1.0 percent of the weight of oil, to remove inhibitor substances, and then treating the oil with a material selected from the group comprising monosaccharides and disaccharides.

9. A process for the removal of green coloration attributed to transformation products of chlorophyll with maximum light absorbancy at substantially 670 millicrons from soybean oil comprising the steps of first treating the oil with charcoal, the oil being dissolved in substantially an equal amount of solvent, to remove inhibitor substances, and then treating the oil with a material selected from the group comprising monosaccharides and disaccharides.

10. A process for the removal of green coloration attributed to transformation products of chlorophyll with maximum light absorbancy at substantially 670 millimicrons from soybean oil comprising the steps of first treating the oil with charcoal, the oil being in a concentrated solution of hexane, to remove inhibitor substances, and then treating the oil with a material selected from the group comprising monosaccharides and disaccharides.

11. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with a material selected from the group comprising monosaccharides and disaccharides and with an acidic adsorbing agent.

12. A process for the removal of green coloration attributed to transformation products of chlorophyll with maximum light absorbancy at substantially 670 millimicrons from soybean oil comprising the steps of first treating the oil with charcoal sufficiently to remove inhibitor substances, then treating the oil with a material selected from the group comprising monosaccharides and disaccharides, and then subsequently treating the oil with an acidic adsorbing agent.

13. A process for the removal of green coloration attributed to transformation products of chlorophyll with maximum light absorbancy at substantially 670 millimicrons from soybean oil comprising the steps of first treating the oil with charcoal sufficiently to remove inhibitor substances, and then treating the oil with a material selected from the group comprising monosaccharides and disaccharides and with acid clay.

14. A process for the removal of green coloration attributed to transformation products of chlorophyll with maximum light absorbancy at substantially 670 millimicrons from soybean oil comprising the steps of first treating the oil with charcoal sufficiently to remove inhibitor substances, then treating the oil with a material selected from the group comprising monosaccharides and disaccharides, and then subsequently treating the oil with acid clay.

References Cited in the file of this patent

UNITED STATES PATENTS

| | | |
|---|---|---|
| 2,255,875 | Buxton et al. | Sept. 16, 1941 |
| 2,272,964 | Coe et al. | Feb. 10, 1942 |
| 2,608,566 | Marmor et al. | Aug. 26, 1952 |

OTHER REFERENCES

Morton: "Laboratory Techniques in Organic Chemistry," published by McGraw-Hill (N. Y.), 1938 (pp. 191 to 193 relied on).

Markley: "Soybeans and Soybean Products," published by Interscience Publishers (N. Y.), 1950 (pp. 195 to 197 relied on).